Aug. 11, 1942.    F. A. GAUGER ET AL    2,292,830
AUTOMATIC CONTROL MEANS FOR HEATING DEVICES
Filed Dec. 5, 1938    3 Sheets-Sheet 1
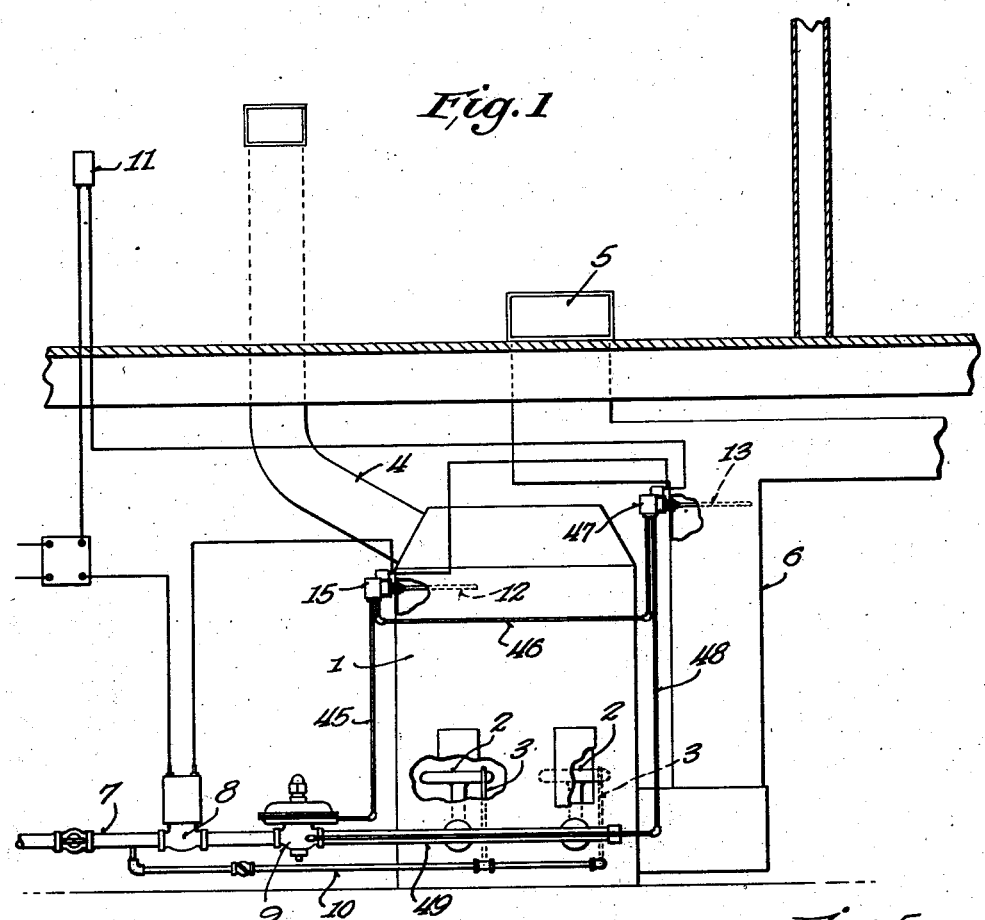
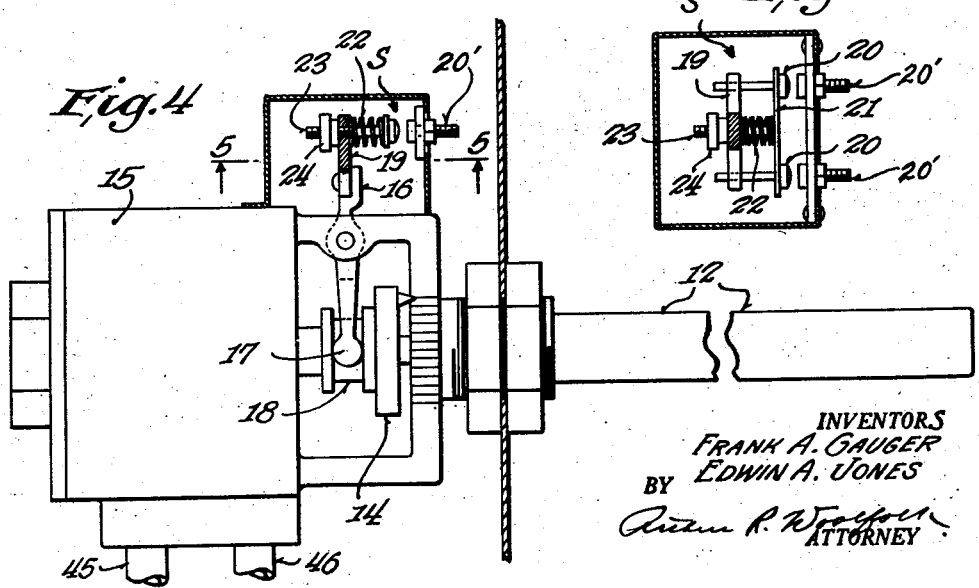
INVENTORS
FRANK A. GAUGER
EDWIN A. JONES
BY
ATTORNEY

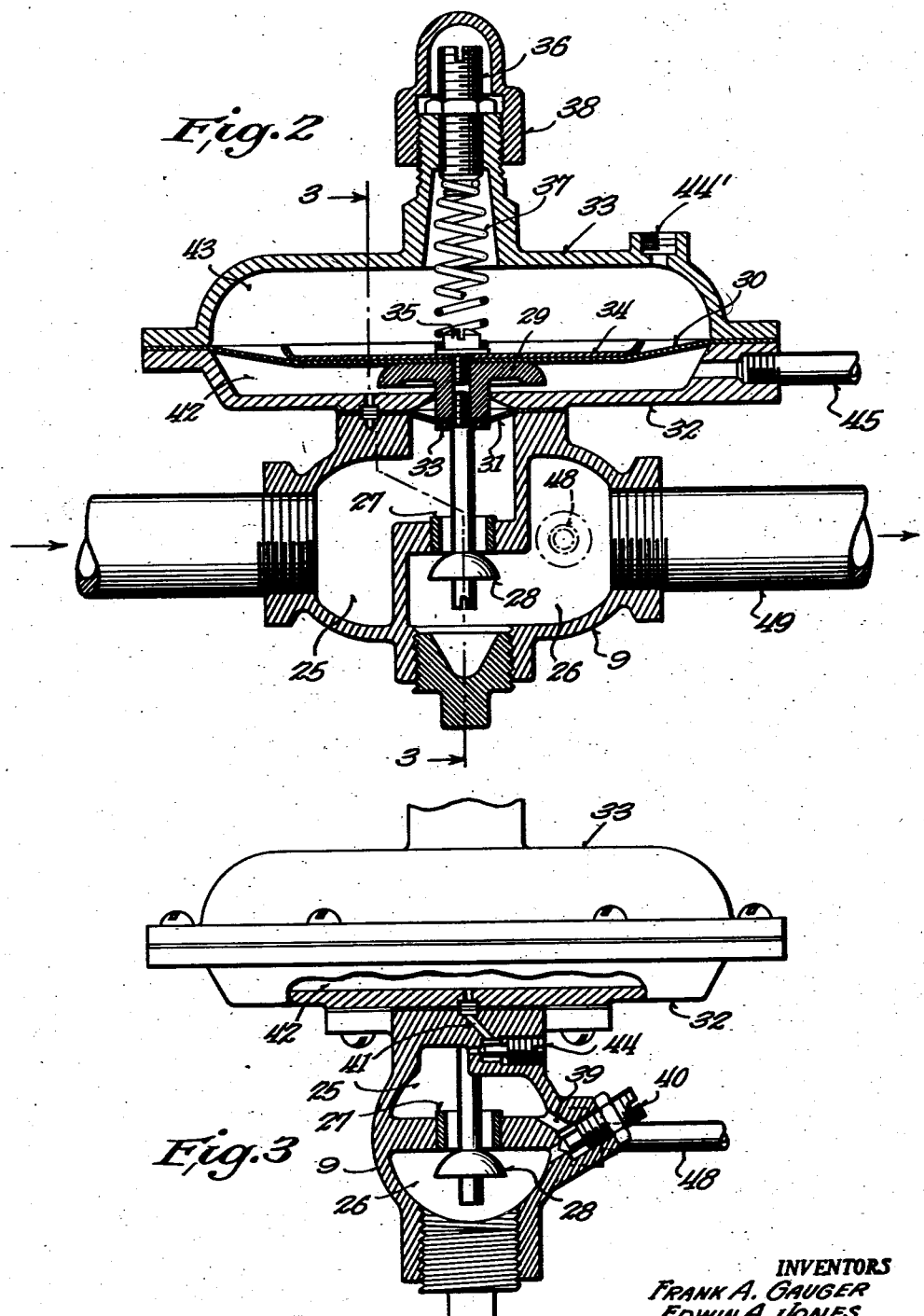
Aug. 11, 1942.    F. A. GAUGER ET AL    2,292,830
AUTOMATIC CONTROL MEANS FOR HEATING DEVICES
Filed Dec. 5, 1938    3 Sheets-Sheet 2
INVENTORS
FRANK A. GAUGER
BY EDWIN A. JONES
ATTORNEY

INVENTORS
FRANK A GAUGER
EDWIN A JONES
BY
ATTORNEY

Patented Aug. 11, 1942

2,292,830

UNITED STATES PATENT OFFICE 2,292,830

AUTOMATIC CONTROL MEANS FOR HEATING DEVICES

Frank A. Gauger, Milwaukee, and Edwin A. Jones, Shorewood, Wis.; said Gauger assignor to Minneapolis-Honeywell Regulator Company, Minneapolis, Minn., a corporation of Delaware Application December 5, 1938, Serial No. 243,944

10 Claims. (Cl. 236—1)

This invention relates to automatic control means for a heating device.

In the automatic controls in which modulation was obtained by means of a modulating valve controlled by a thermostat or pressure responsive means, it was the usual practice heretofore to have the fuel turn on and cut off by the modulating valve so that a certain range of movement of the condition responsive means was needed for accomplishing the mere opening and closing of the modulating valve, thereby leaving only a portion of the range of motion of the condition responsive means effective for securing the modulating action of the modulating valve.

In these heretofore known systems difficulty has been encountered in preventing flash-back on initial opening when a Bunsen burner was used, for instance in a gas-fired furnace or boiler.

This invention is designed to overcome the above noted defects, and objects of this invention are to provide a main on and off valve which may be automatically or manually controlled, and in addition and completely separate therefrom to provide modulating means which may take the form of a combined automatic pressure regulating and modulating valve, such modulating valve being controlled by condition responsive means such as thermostats, pressurestats, or other means of control, and in which the modulating valve moves to open position whenever the on and off valve has closed.

In greater detail, specific objects of this invention are to provide an on and off main valve for controlling the fuel flow to a burner of a heating device and to interpose between the on and off main valve and the burner a modulating valve which is so constructed that when the main on and off valve closes, the modulating valve moves to open position, so that when the main on and off valve again opens, a full flow of fuel to the burner is secured before the modulating valve takes control and modulates the fuel flow.

In the systems heretofore in use it has been the regular practice to provide a pressure regulator ahead of the main valve, the pressure regulator merely maintaining the pressure supplied the main valve constant irrespective of pressure fluctuations in the outside mains.

This invention contemplates two main changes in the functioning of the pressure regulator. One is the repositioning of the pressure regulator between the main valve and the burner, and the other is the independent control of the pressure regulator by the condition responsive means, whereby the pressure regulator is caused to function not only as a pressure regulator but also in accordance with an artificial pressure standard built up or controlled by the condition responsive means.

In the prior systems where the pressure regulator is put in a position in advance of the main valve, it is obvious that when the main valve is closed, the pressure regulator cuts off entirely and thereafter when the main valve is opened, the pressure regulator subsequently opens to maintain the pressure.

In this invention, the reverse arrangement is contemplated whereby a novel functioning of the pressure regulator is obtained, the pressure regulator being placed between the main on and off valve and the burner, so that when the main valve is closed, the pressure regulator exhausts freely into the manifold of the burner, thereby causing the pressure regulator to open fully when the main valve is closed.

By following this new principle of operation, it is apparent that when the main valve opens, a full flow of fuel passes from the main valve through the then fully opened pressure regulator to the burner, thereby guarding against any possibility of back-firing at the time of ignition by supplying an initial full fuel flow to the burner, the condition responsive means thereafter taking control of the pressure regulator and thereby causing the pressure regulator to perform the additional function of modulating the fuel flow to the burner in accordance with the exact demands of the heating system.

This invention has for a further object the provision of a time delay means for the automatic combined pressure regulating and modulating means so that an interval of time elapses before the condition responsive means takes control of the pressure regulator after the opening of the main on and off valve.

The invention further contemplates, in one form thereof, the provision of manual means whereby the setting of the combined pressure regulating and modulating valve may be manually adjusted for a definite fuel pressure and, in addition, may be governed by the condition responsive means.

Further objects are to provide automatic means for varying the manual setting of the combined pressure regulating and modulating valve so that if the pressure in the supply mains falls below the pressure at which the device is set, the automatic means will readjust the setting to a lower value, the combined pressure regulating and modulating valve completely closing if the pressure in the mains falls below a value at which the device will function.

Further objects are to provide a system of control for a heating device in which limit means are provided for controlling the main on and off valve, and in which condition responsive means are provided for controlling the combined pressure regulating and modulating valve independently of the motion of said on and off main valve, the condition responsive means causing the combined pressure regulating and modulating valve to modulate the fuel flow and the limit means causing said main on and off valve to close and completely cut off the fuel flow when the temperature exceeds the point at which modulation takes place, whereby two independent systems are employed but in which these independent systems of control are synchronized one with the other so that the opening and closing of the main valve takes place at a temperature above the modulating range, and so that the modulating valve starts from full open position and moves to modulating position upon opening of said main valve.

Embodiments of the invention are shown in the accompanying drawings, in which:

Figure 1 is a diagrammatic view showing the control system.

Figure 2 is a vertical sectional view through the combined pressure regulating and modulating valve.

Figure 3 is a fragmentary view showing a section through the lower portion of the valve taken on the line 3—3 of Figure 2.

Figure 4 is a view, with parts broken away and in section, showing one of the condition responsive means.

Figure 5 is a fragmentary horizontal sectional view on the line 5—5 of Figure 4.

Figure 6:
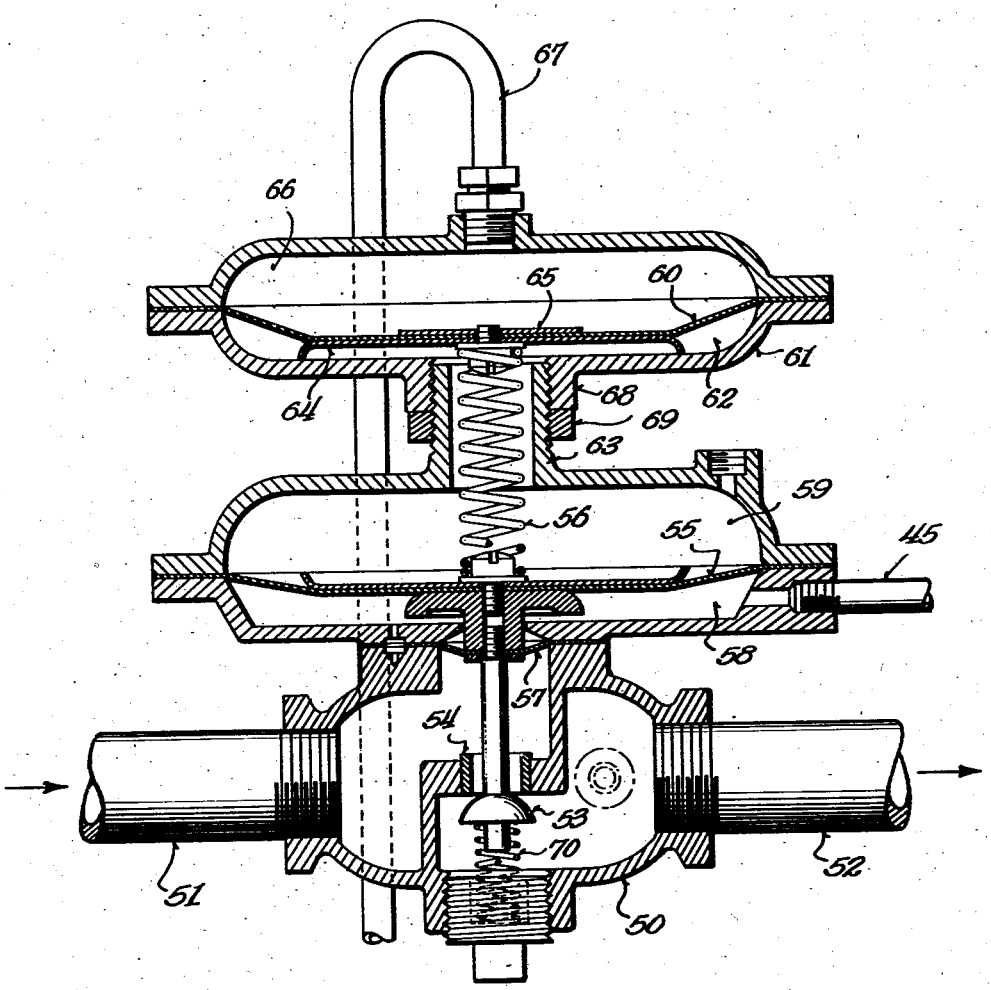
Figure 6 is a view corresponding to Figure 2 showing a modified form of combined pressure regulating and modulating valve.

Referring to Figure 1, it will be seen that the heating device chosen for illustration is a gas-fired furnace indicated generally by the reference character 1, the furnace being provided with burners 2 equipped with pilot lights 3 in the usual manner. The furnace is provided with a plurality of outlet pipes 4, one of which is shown, for delivering the hot air to the room or other point at which the heat is to be supplied, and with cold air returns one of which is shown at 5, such cold air returns leading to a main cold air return 6 in the usual manner.

The gas is supplied through the main 7 through a main on and off valve 8 and through a combined pressure regulating and modulating valve 9. It is to be noted particularly that the combined pressure regulating and modulating valve 9 is located between the main on and off valve 8 and the burner or burners. The pilot supply pipe 10 extends from a point in advance of the main on and off valve 8 and leads to the pilots 3.

In the form chosen for illustration, a conventional electrically operated on and off main valve 8 has been illustrated, though it is to be understood that this valve may be diaphragm operated by gas pressure, if so desired. The on and off valve 8 is controlled either jointly from a room thermostat, 11, a bonnet thermostat 12 located in the bonnet of the furnace, and from a thermostat 13 which may be located in the cold air duct return or just above the floor of the room, or, if desired, the main on and off valve may be independently controlled either from the room thermostat alone or from the thermostat 12 or the thermostat 13. Each of the thermostats 12 and 13 in the form chosen for illustration controls a gas throttling valve for the bleed line from the combined pressure regulating and modulating valve and also controls an electric switch in the circuit of the on and off valve. The thermostats are of similar construction. As shown, the electrical control for the on and off valve 8 for each of the thermostats is in series so that all of the condition responsive means are effective. Nevertheless it is, as stated hereinabove, contemplated controlling the on and off valve from a single condition responsive means or, if desired, the on and off valve may be controlled from a pair of the condition responsive means.

Obviously the thermostats can be replaced by other types of condition responsive means without departing from the spirit of this invention.

One of the thermostats, for instance the thermostat 12, has been shown in greater detail in Figures 4 and 5. This thermostat 12 is provided with the usual expansible and non-expansible member in accordance with the customary practice and is provided with an adjustment 14 of any well known type. The thermostat or other condition responsive means controls the throttling control gas valve 15 in accordance with the usual practice, and in addition controls a limit switch indicated generally at S for the on and off main valve 8. This limit switch may be of the well known snap action type or may be a slow moving switch as desired. The latter form has been chosen for illustration and may comprise the pivoted lever 16 bifurcated and provided with the arms 17 which fit between flanges carried by the movable member 18 of the thermostat, such movable member also actuating the gas valve 15 in the control bleed line hereinafter described. The lever 16 carries an insulating plate 19 which slidably receives a pair of headed contact members 20 bridged by a connecting bar 21 and urged outwardly by means of a spring 22. The contact bar 21 may be rigidly secured to the headed contact pins 20 and may have a screw threaded member 23 extending through the plate 19 and provided with an adjusting thumb nut 24 so that the switch may be adjusted to open at any predetermined point in the motion of the movable member 18 of the thermostat. In the position of the parts shown in Figure 4, the switch is shown in open position. The conductors lead to the stationary contacts 20'.

The combined pressure regulating and modulating valve indicated generally at 9 has been shown in greater detail in Figures 2 and 3. It will be seen that this valve comprises the inlet chamber 25 and the outlet chamber 26 and has a valve seat 27 and a cooperating valve 28. The valve 28 has its shank screw threaded into a small head 29 mounted below the diaphragm 30. It is to be noted that a small freely flexible diaphragm 31 is clamped between the lower portion 32 of the diaphragm chamber and the main body of the valve. Preferably the shank of the valve 28 is shouldered and clamps the sealing diaphragm 31 between a washer 33 and the lower portion of the head 29 to secure a gas-tight seal.

The diaphragm chamber of the combined pressure regulating and modulating valve is provided with an upper casing 33 which clamps the diaphragm 30 between itself and the lower casing. Preferably a plate 34 is positioned above the diaphragm 30. A screw 35 passes through this plate and into the head 29 and thus clamps the diaphragm 30 between the plate and the head. The upper casing 33 continues upwardly and is internally screw threaded to receive the adjusting screw 36 for manual adjustment of the spring 37, thereby determining the setting at which the combined pressure regulating and modulating valve will close, a suitable lock nut being provided for locking the screw 36 in place, and if desired, a closure cap 38 may be provided screw threaded upon the upwardly extending portion of the casing 33 to house the adjusting screw 36.

Minimum flow by-pass means is provided between the inlet chamber 25 and the outlet chamber 26 of the combined pressure regulating and modulating valve 9 and this by-pass means may take the form of ducts 39 provided with a needle valve 40 whereby the minimum flame adjustment may be made depending on the size or number of burners employed or the calorific value of the gas or characteristics of the load.

A small duct 41 leads from the inlet chamber 25 to the chamber 42 below the diaphragm 30, the upper chamber 43 above the diaphragm being freely vented as indicated at 44' either directly to the air or to any suitable point. The duct 41 allows gas to pass into the chamber 42 to thus provide pressure for actuating the pressure responsive diaphragm 30 of the valve. The amount of gas flow is regulated by means of the adjusting needle valve 44 so that a constricted passage is formed and so that the constriction of the passage may be predetermined for a purpose to hereinafter appear.

A bleed line 45 extends from the chamber 42, see Figures 1 and 2, to the gas valve 15 of the thermostat 12. From there, a bleed line 46 continues to the gas valve 47 of the thermostat 13, and from this point a bleed line 48 leads back to the chamber 26 of the valve 9, as shown most clearly in Figures 2 and 3, so that the bleed line finally discharges into the pipe 49 leading from the combined pressure regulating and modulating valve to the burners.

The operation of the apparatus is as follows:

Assuming that the on and off valve 8 is open and the throttle valve 9 is also open, it is apparent that as the temperature rises, the thermostats 12 and 13 or either of them will begin throttling the valves 15 and 47 and consequently restrict the flow through the bleed lines 45, 46 and 48. As a result of this, pressure will build up in the chamber 42, see Figure 2, of the combined pressure regulating and modulating valve and will lift the valve 28 towards closed position against the action of the spring 37, thus throttling the flow of fuel to the burners. If the temperature continues to rise, this throttling action continues until the combined pressure regulating and modulating valve is completely closed. However, a minimum supply of gas passes through the port 39, see Figure 3, and supplies sufficient gas for a minimum flame for the burners. If this minimum flame is in excess of what is needed, one or the other or both of the switches S will open or the room thermostat 11 will open, thereby opening the circuit of the on and off valve and allowing this valve to quickly move to completely closed position. This cuts off all supply of fuel to the burners, including the minimum flame supply. There is now no gas pressure in the chamber 25 of the combined pressure regulating and modulating valve, see Figure 2, and consequently the valve will move to full open position, though no fuel will flow to the burners as the on and off valve is completely closed.

Suppose the temperature falls a slight amount. The switches S and the room thermostat will close, thereby fully opening the on and off valve. A full flow of fuel passes through the fully opened combined pressure regulating and modulating valve to the burners and the fuel is ignited without any possible chance of flash-back due to this full initial flow. Assuming that one or the other of the thermostats still either completely or partially throttles its corresponding gas valve 15 or 47 for instance, it will be seen that the combined pressure regulating and modulating valve moves either to full closed position or to an approximately closed position, as gas pressure will build up in the chamber 42, such gas passing through the duct 41, see Figure 3, and thus causing the diaphragm 30 and the valve 28, see Figure 2, to move upwardly. There is, however, a delayed action of the combined pressure regulating and modulating valve due to the restriction of the gas flow to the chamber 42 which is determined by the adjustment of the needle valve 44. This delay is sufficient to cause the combined pressure regulating and modulating valve to remain open until after the full fuel flow has passed to the burners. Thereafter the combined pressure regulating and modulating valve moves to the position determined by the thermostats 12 and 13. It is apparent that the restricted flow of gas passing the needle valve 44 is balanced against the restricted discharge of gas through the bleed lines 45, 46 and 48, so that the diaphragm 30 is balanced against the action of the spring 37 at the particular point called for by the position of the thermostats 12 and 13.

If the thermostats 12 and 13 are still closed at the time the on and off valve opens, it is apparent that the combined pressure regulating and modulating valve will first remain open allowing full fuel flow to the burners, and will thereafter move to closed position, thus cutting the flow down to a minimum flow after an initial full fuel flow has occurred. On the other hand, if the thermostats 12 and 13 have partially opened their valves, the combined pressure regulating and modulating valve will first allow full fuel flow to the burners and thereafter will move to its particular position called for by the position of the thermostats 12 and 13. In each instance, however, it is to be noted particularly that the combined pressure regulating and modulating valve always moves to full open position when the on and off main valve closes, and that thereafter when the on and off main valve opens, the combined pressure regulating and modulating valve remains open until after an initial full fuel flow to the burners has occurred, and that thereafter the combined pressure regulating and modulating valve begins modulating or controlling the flow of fuel in accordance with the demands of the system.

It is apparent that the adjustment or pressure for which the combined pressure regulating and modulating valve is set may be varied by adjusting the screw 36 to thereby vary the pressure of the spring 37, the cap 38 being removed during this adjustment and replaced after the screw 36 has been locked in its adjusted position. Thus it is possible to manually adjust the combined pressure regulating and modulating valve for any desired pressure. It is to be noted that if the gas valves 15 and 47 of the thermostats 12 and 13 are in the fully opened position, the pressure in the discharge pipe 49 between the combined pressure regulating and modulating valve and burner will be equalized in the chamber 42 below the diaphragm 30, so that the combined pressure regulating and modulating valve will operate as a conventional pressure regulator limiting the discharge pressure to a value not to exceed the value for which the adjustment of the spring 37 has been made.

The reason for the above is that the pressure in the pipe 49 is directly applied in the chamber 42 through the bleed line 48, 46 and 45, it being noted at this point that the area of the small duct 41 in comparison to that through the bleed line 48, 46 and 45 is insignificant and has no material effect.

It is to be noted that the adjustment of the needle valve 44 determines the delay in the modulating action of the combined pressure regulating and modulating valve as hereinabove described. It also controls the differential of the thermostats 12 and 13 for it is apparent that if a relatively larger flow of gas is permitted past the needle valve 44 by opening it up, that the thermostats 12 and 13 will have to open farther, or, in other words, move a greater distance, thus causing an increase in the differential of these thermostats, that is to say, causing the thermostats to execute motions through a wider temperature range in order to control the combined pressure regulating and modulating valve. On the other hand, by adjusting the needle valve 44 closer to its seat, it is apparent that not only is the time delay increased but also the differential or range of motion of the thermostats 12 and 13 to secure control of the combined pressure regulating and modulating valve is decreased. Thus it is possible to vary the differential of the thermostats by the adjustment of the needle valve 44 on the combined pressure regulating and modulating valve.

Obviously the same result can be obtained by substituting various sized orifices in place of the needle valve 44, or an orifice may be provided as a minimum opening and a needle valve in parallel to provide an adjustable opening in excess of the minimum.

It is obvious that adjustment of the needle valve 49 determines the size of the minimum flame. For example, in a small single burner furnace the needle valve is only opened a slight distance, whereas in a large furnace or a multiple burner furnace the needle valve is opened to a greater distance. Further than this, the adjustment of the needle valve will take care of differences in the specific gravity or calorific value of the gas or characteristics of the load.

It is also to be noted from reference to Figure 4 that the adjustment of the nut 24 of the switch 8 determines the point at which the switch will open the circuit of the on and off main valve.

Figure 6 shows a construction similar to that shown in Figure 2 except that provision has been made not only for the manual adjustment or setting of the combined pressure regulating and modulating valve but also for an automatic adjustment of this setting. The purpose of this automatic adjustment, which will hereinafter be described in detail, is to lower the pressure adjustment of the combined pressure regulating and modulating valve when the pressure in the mains falls to a point below that at which the manual setting has been made. If there are wide fluctuations in the pressure in the mains, the construction shown in Figure 6 fulfills a very useful function. In addition to these functions, the form shown in Figure 6 also provides for the complete automatic closing of the combined pressure regulating and modulating valve in the event that the pressure in the mains drops below the point at which the combined pressure regulating and modulating valve will operate. This equipment is not usually necessary and may be regarded as merely an auxiliary equipment for taking care of abnormal and unusual conditions.

In this form of the invention the combined pressure regulating and modulating valve is indicated at 50. It is provided with the inlet pipe 51 and with the outlet pipe 52 which lead respectively to the main on and off valve and to the burners, exactly as for the form shown in Figure 1. It is also equipped with the valve 53 and the valve seat 54, as previously described, the valve 53 being operated by means of the diaphragm 55 which is normally urged downwardly by means of the spring 56. A sealing diaphragm 57 is provided as previously described. The chamber 58 below the diaphragm is supplied with gas in exactly the same manner as shown in Figures 2 and 3 and is connected to the bleed line 45 exactly as in the previously described form. The chamber 59 above the diaphragm vents to the air as shown.

This form of the invention is provided with an upper diaphragm 60 dividing the upper casing 61 into the lower chamber 62 in communication with the chamber 59 through the hollow externally threaded neck 63 and consequently freely venting to the air. The diaphragm is provided with a bottom plate 64 having a downturned marginal flange that normally rests upon the bottom of the casing 61, as shown in Figure 6. It may be provided with an upper washer 65 so that the diaphragm is clamped between the members 64 and 65 by means of a screw as shown, or in any other suitable way. The spring 56 is interposed between the two diaphragms 60 and 55 and may be centered by being positioned over the screw heads as shown. The upper chamber 66 for the upper diaphragm is supplied with gas directly from the mains preferably ahead of the on and off valve 8 by means of a pipe 67 so that the chamber 66 is always at the same pressure as that of the mains.

The manual adjustment is secured by screwing the neck portion 68 of the upper casing 61 upwardly or downwardly on the threaded extension on the neck 63 of the lower casing, thereby regulating the pressure exerted by the spring 56 upon the diaphragm 55. After the desired adjustment has been obtained, the upper casing is locked in place by means of the lock nut 69. A light spring 70 is positioned below the valve 53 and urges the valve towards closed position but is normally overpowered by the spring 56.

The operation of the combined pressure regulating and modulating valve is identically the same as that previously described under normal conditions. However, it is to be noted that the upper end of the spring 56 is held down by the diaphragm 60. If the pressure in the mains should drop to an abnormally low point so that it will not operate the combined pressure regulating and modulating valve, which depends for its operation upon a reduction in pressure between the pipes 51 and 52, the diaphragm 60 will move upwardly, thus relieving the pressure exerted by the spring 56, and the light spring 70 will cause the valve 53 to move towards the closed position. Therefore, even under this unusual abnormal condition, the combined pressure regulating and modulating valve will function.

The same result can be accomplished without the use of the light spring 10 by merely turning the entire apparatus shown in Figure 6 upside down so that the weight of the valve and the associated parts tends to close for abnormally low gas pressure.

It will be seen that a novel system of control has been provided and a novel mode of functioning of the parts has been obtained so that the combined pressure regulating and modulating valve located between the on and off valve and the burner moves to full open position whenever the on and off valve closes, thereby insuring an initial full flow of fuel to the burner at the time of ignition and guarding against any possibility of flash-back. After this initial full flow of fuel, the combined pressure regulating and modulating valve with a certain time delay hereinbefore described, moves to its correct position as determined by the condition responsive means.

It will be seen further that after the combined pressure regulating and modulating valve has cut off, the minimum flame still persists. If the amount of heat furnished by this minimum flame is too great, the on and off valve will cut off the minimum flame and thus all supply of fuel to the burner is stopped.

When the main on and off valve closes, the combined pressure regulating and modulating valve automatically moves to open position, thus setting the device for the next cycle of operation, as hereinabove described.

It will be seen further that the construction is very simple, that it is cheap to produce, and easy to install.

It is to be particularly noted that in the systems of control herein shown the bleed line from the pressure actuated means of the combined pressure regulating and modulating valve leads to the low pressure manifold which in turn leads to the burner. There is no necessity for an exhaust of any bleed gas to the atmosphere, the operation being entirely dependent on a differential between the high pressure side and low pressure side of the combined pressure regulating and modulating valve.

Although this invention has been described in considerable detail, it is to be understood that such description is intended as illustrative rather than limiting, as the invention may be variously embodied and is to be interpreted as claimed.

We claim:

1. In a device of the class described, a burner, a main valve controlling the flow of fuel to said burner, a modulating valve interposed between said main valve and said burner, condition responsive means controlling said modulating valve, said main valve when closed interrupting the control of said modulating valve by said condition responsive means and when opened restoring said control, said modulating valve having valve-opening means effective when said main valve closes, and delay means for causing a delay in the restoration of the control of said modulating valve immediately after said main valve opens, whereby the control of said modulating valve is delayed until after said burner has been first supplied with a large volume of fuel.

2. In a system of control, heating means including a burner, a main on and off valve controlling the flow of fuel to said burner, a separate and distinct pressure regulator interposed between said main valve and said burner, said pressure regulator comprising a fluid pressure motor and a control valve operated thereby, and condition responsive means responsive to the condition of said heating means and controlling the pressure acting on said fluid pressure motor, and an adjustable valve means for varying the amount of pressure fluid acting on said fluid pressure motor to thereby vary the operating differential of said condition responsive means.

3. In a heating system comprising a burner, a main on and off valve for controlling the flow of an ingredient of a combustible mixture to said burner, a pressure regulator interposed between the burner and the on and off valve, and said pressure regulator comprising a fluid pressure motor and a control valve operated thereby, and automatic condition responsive means for controlling said pressure regulator, said pressure regulator valve having compensating means for varying the cut off position of said pressure regulator for compensating for abnormal pressure variations.

4. The combination of burner means, means for supplying a combustible mixture to said burner means, an on and off valve for turning on and cutting off the supply of one ingredient of said combustible mixture to said burner means, a pressure regulator and means for causing a minimum by-pass flow around said pressure regulator, both said last mentioned means and said pressure regulator being located between said on and off valve and said burner means, said pressure regulator comprising a fluid pressure motor and a control valve operated thereby, and control means, said pressure regulator being controlled by said control means, said control means being responsive to conditions produced by said burner means for building up an artificial operating pressure for said pressure regulator in response to said condition to cause said pressure regulator to modulate to any pressures below the maximum operating pressure for which the pressure regulator is set, said on and off valve when closed cutting off all flow of the said one ingredient to said burner means and said pressure regulator limiting the maximum operating pressure of said one ingredient to a predetermined maximum value.

5. The combination of burner means, means for supplying a combustible mixture to said burner means, an on and off valve for turning on and cutting off the supply of one ingredient of said combustible mixture to said burner means, a pressure regulator and means for causing a minimum by-pass flow around said pressure regulator, both said last mentioned means and said pressure regulator being located between said on and off valve and said burner means, said pressure regulator comprising a fluid pressure motor and a control valve operated thereby and condition responsive control means for building up an artificial operating pressure for said pressure regulator in response to said condition to cause said pressure regulator to modulate to any pressures below the maximum operating pressure for which the pressure regulator is set, said pressure regulator being controlled by said condition responsive control means and being biased open and moving to open position when said on and off valve closes, said on and off valve when closed cutting off all flow of the said one ingredient to said burner means and said pressure regulator limiting the maximum operating pressure of said one ingredient to a predetermined maximum value.

6. The combination of burner means, means for supplying a combustible mixture to said burner means, an on and off valve for turning on and cutting off the supply of one ingredient of said combustible mixture to said burner means, a pressure regulator located between said on and off valve and said burner means, said pressure regulator comprising a fluid pressure motor and a control valve operated thereby, condition responsive control means for building up an artificial operating pressure for said pressure regulator in response to said condition to cause said pressure regulator to modulate to pressures below the maximum operating pressure for which the pressure regulator is set, said pressure regulator being controlled by said condition responsive control means, and minimum flame supply means by-passed around said pressure regulator, the minimum flame supply being cut off when said on and off valve closes.

7. The combination of burner means, means for supplying a combustible mixture to said burner means, an on and off valve for turning on and cutting off the supply of one ingredient of said combustible mixture to said burner means, a pressure regulator located between said on and off valve and said burner means, said pressure regulator comprising a fluid pressure motor and a control valve operated thereby, condition responsive control means for building up an artificial operating pressure for said pressure regulator in response to said condition to cause said pressure regulator to modulate to pressures below the maximum operating pressure for which the pressure regulator is set, said pressure regulator being controlled by said condition responsive control means, and limit control means for controlling said on and off valve.

8. The combination of burner means, means for supplying a combustible mixture to said burner means, an on and off valve for turning on and cutting off the supply of one ingredient of said combustible mixture to said burner means, a pressure regulator and means for causing a minimum by-pass flow around said pressure regulator, both said last mentioned means and said pressure regulator being located between said on and off valve and said burner means, said on and off valve when closed cutting off all flow of said one ingredient to said burner means, said pressure regulator comprising a fluid pressure motor and a control valve operated thereby, and control pilot valve means, said pressure regulator being controlled by said control pilot valve means, said control pilot valve means being responsive to conditions produced by said burner means for building up an artificial operating pressure for said pressure regulator as said control pilot valve means moves towards closed position in response to said condition to cause said pressure regulator to modulate to pressures below the maximum operating pressure for which the pressure regulator is set.

9. The combination of burner means, means for supplying a combustible mixture to said burner means, an on and off valve for turning on and cutting off the supply of one ingredient of said combustible mixture to said burner means, a pressure regulator and means for causing a minimum by-pass flow around said pressure regulator, both said last mentioned means and said pressure regulator being located between said on and off valve and said burner means, said on and off valve when closed cutting off all flow of said one ingredient to said burner means, said pressure regulator comprising a fluid pressure motor and a control valve operated thereby, control pilot valve means, said pressure regulator being controlled by said control pilot valve means, said control pilot valve means being responsive to conditions produced by said burner means for building up an artificial operating pressure for said pressure regulator as said control pilot valve means moves towards closed position in response to said condition to cause said pressure regulator to modulate to pressures below the maximum operating pressure for which the pressure rgulator is set, and limit control means for controlling said on and off valve.

10. The combination of burner means, means for supplying a combustible mixture to said burner means, valve means for controlling the supply of one ingredient of said combustible mixture to said burner means, said valve means including a pressure regulator comprising fluid motor means and a control valve operated thereby, a first condition responsive means controlling said valve means for initially giving said burner a full supply of fuel, and a second condition responsive means controlling said pressure regulator and responsive to temperature for building up an artificial pressure in said pressure regulator to cause said pressure regulator to modulate the said ingredient at pressures below that for which said pressure regulator is set, whereby the setting of said pressure regulator is proportioned to said temperature.

FRANK A. GAUGER.
EDWIN A. JONES.